June 5, 1951 D. B. TALBOT 2,555,714

ALARM SYSTEM

Filed Jan. 24, 1950 2 Sheets-Sheet 1

David B. Talbot
INVENTOR.

BY Clarence A. O'Brien
and Harvey B. Jacobson
Attorneys

June 5, 1951 D. B. TALBOT 2,555,714

ALARM SYSTEM

Filed Jan. 24, 1950 2 Sheets-Sheet 2

David B. Talbot

INVENTOR.

BY Clarence A. O'Brien and Harvey B. Jacobson Attorneys

Patented June 5, 1951 2,555,714

UNITED STATES PATENT OFFICE 2,555,714

ALARM SYSTEM

David B. Talbot, Britton, Okla., assignor of one-tenth to H. S. Brimm, one-tenth to H. W. Sims, and one-fifth to Frank W. Jones, all of Oklahoma City, Okla.

Application January 24, 1950, Serial No. 140,279

18 Claims. (Cl. 179—5)

This invention is a continuation-in-part of my earlier Patent No. 2,498,613, and it relates to an improvement and a modification of the alarm system disclosed in the said earlier application.

In the above-mentioned earlier application an alarm system for use in connection with a subscriber's telephone station and line was described in which a local alarm circuit arranged on the guarded premises operates a dialing apparatus connecting the subscriber's telephone station with the telephone station of the police or of a central fire watching station, such connection being effected in the normal way over the usual business telephone lines, a recorded spoken message being sent over the said telephone lines as soon as the call is answered.

This operation is mainly performed by a special relay thrown into different positions by electric line impulses which positions are retained after the disappearance of an impulse, said relay connecting the lines with a special dialing and message transmitting apparatus the operation of which is partly controlled by the aforesaid special relay and partly by its own contacts, the stopping of the dialing and calling device being produced by the party which has been called when the said party operates a special device connected with its receiver.

According to the present invention the dialing and message transmitting device is simplified and the arrangement is generally improved by using a dialing apparatus with two different dialing means and by so arranging the cooperation of the said dialing means that the second dialing device calls the exchange operator when the first dialing device has not elicited a response in the station which has been called repeatedly during certain periods.

A further feature of the invention consists in the arrangement of means for operating the impulse producing means merely during a part of the period of operation of the dialing apparatus while the impulse contacts of the dialing apparatus are removed from connection during part of the period so as to leave the telephone circuit unbroken during a large part of said period while connecting them only during that part during which dialing actually occurs.

A further object of the invention consists in a simplification of the means for arresting the dialing mechanism and for resetting the apparatus when the called station answers the call the arresting and resetting operations being started merely by the removing of the receiver from the hook in the called station.

A further object of the invention consists in providing means for controlling the relays which are connected across a subscriber's line in the event of an alarm by the telephone currents passing through the loop and in providing a further relay which is operable only when a current flows in a definite direction. Therefore this relay is only actuated upon reversal of the current when the called station answers a call.

A further object of the invention consists in providing a special cut-off switch operable only upon operation of the aforesaid relay which is responsive to a definite direction of current obtained during the answering of the call by the called station but also operable by the operation of the resetting device, said switch bringing the lines into operative connection with the recording device and, upon further operation, restoring the original connections.

A further improvement of the system disclosed in my earlier Patent No. 2,498,613, dated February 21, 1950, consists in the removal of the relay switch, thrown by each impulse into a position retained until a further impulse arrives, from the subscriber's telephone lines and in controlling the said relay switch by means of relays which may be connected with the line and may form part of the loop bridging the subscriber's station in the event of an alarm.

A further improvement of the system disclosed in my earlier Patent No. 2,498,613, dated February 21, 1950, consists in providing a time controlled relay with normally open relay contacts which are arranged in the loop connected across the lines in the event of an alarm, said relay closing the loop for the purpose of the alarm only after a predetermined period, which period is sufficiently long to produce disconnection of any subscriber's station which may happen to be connected with the line when the alarm connections are made in the event of a burglary or of a fire. Thus not only the subscriber station in which the alarm originates is disconnected from the line by the operation of the alarm relay and the dependent relay, but also stations at the remote end of the line which happen to be connected with that end of the line which leads to the subscriber's station in which the alarm originates are disconnected thus leaving the lines clear for the transmissions of the alarm message.

The invention is illustrated in the accompanying drawings showing two modifications of the invention. It is however to be understood that the alarm system described in the detailed specification and shown in the drawings is illustrated by way of example only and that the two modifications shown have been selected in order to illustrate the principle of the invention and the best modes of applying said principle. No survey of the modifications embodying the invention has been made in the specification and further modifications of the examples illustrated in the drawings are therefore not necessarily departures from the essence of the invention.

Figure 1:
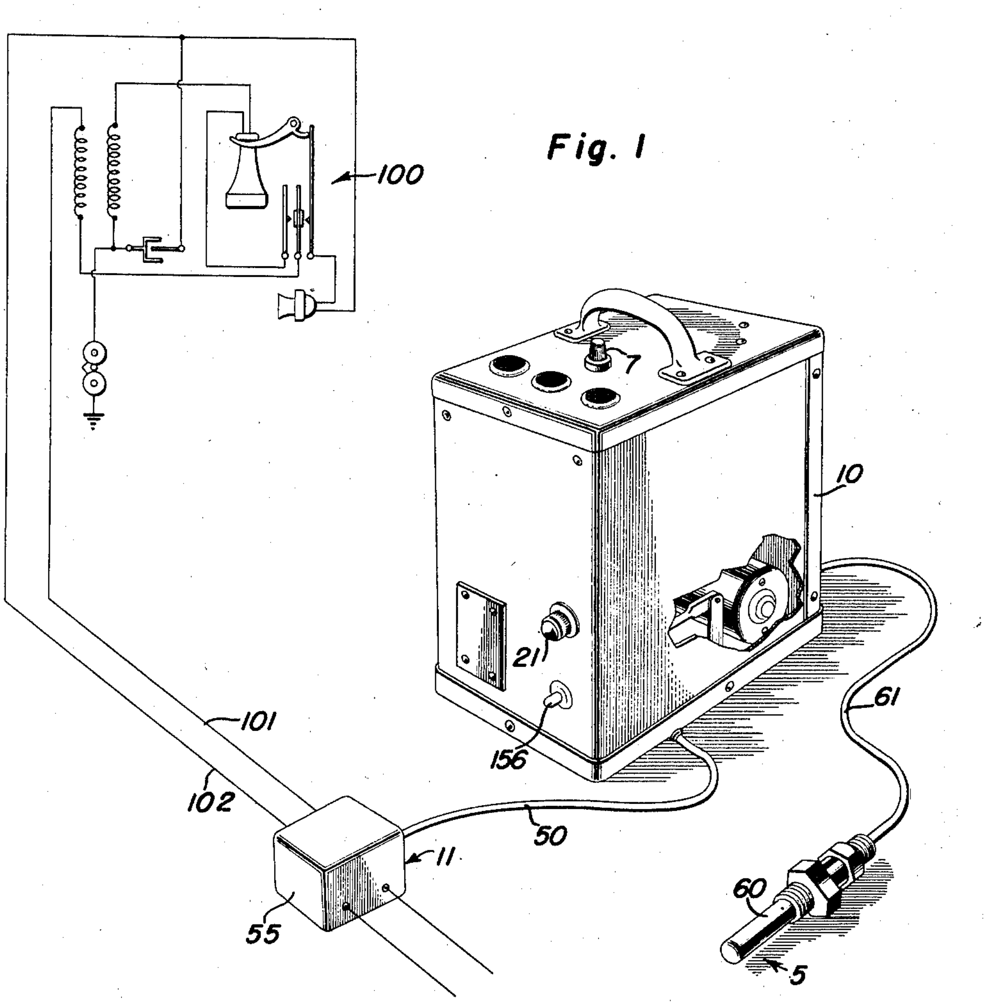
Figure 1 is a diagrammatic general view of the apparatus illustrating the assembly and the disposition of the parts.

The alarm system according to the present invention is in a general way identical with or similar to the system described in my earlier Patent No. 2,498,613, dated February 21, 1950. The general features of the system need therefore not be described in detail. It is assumed that the house, home, hotel or other locality to be guarded by the alarm system is provided with a telephone station and with an alarm circuit either of the open contact or of the closed contact type and that the alarm circuit shows one of the well known numerous constructions used for this purpose. In the diagram, therefore, the alarm circuit is not shown in detail but is merely indicated diagrammatically by a single closed contact 5 in Figure 2 or by a single open contact 6 in Figure 3, the latter figure showing also the necessary modification of those parts of the system which would have to be used when an open contact alarm circuit is substituted for the closed contact alarm circuit.

The apparatus according to the invention therefore essentially consists of a relay 11 associated with the subscriber's station 100 and capable of connecting a loop across the subscriber's lines, of a dialing apparatus producing dialing impulses corresponding to selected numbers, of a means for calling further numbers alternatively, if the number which has been first called does not answer the call, of a record carrying apparatus automatically started upon closure of the alarm circuit, of means for producing talking currents corresponding to the recorded message, and further of means for stopping the dialing mechanism as soon as the called subscriber answers. Moreover, resetting means and auxiliary apparatus, local alarm signals and warning signals and means for supplying current in the event of a current failure in the main supply source are arranged.

All the above named devices and mechanisms are contained in a casing 10 which may be placed near the subscriber's telephone station 100 and which houses the said mechanisms, with the sole exception of the relay device 11 which controls the subscriber's telephone lines 101, 102 and which is therefore located at a suitable point along said line. This relay is contained in a box 55 connected with the apparatus within the casing 10 by means of a cable 50.

The apparatus preferably consists of a record carrying device 12 cooperating with a pick-up 14 which is driven by means of a shaft 15 rotated by a motor 16. The same shaft may also drive the dialing device 17 by means of which a number of the police or fire station is automatically called. Moreover, the apparatus comprises a cut-off device 18 and a number of relays described in detail below, one of which is a relay switch 23 of the type described in my above mentioned co-pending application which shifts its contact upon each incoming impulse and maintains its position also after the impulses has ceased until a new impulse reverses the position.

The apparatus is provided with current by means of a special arrangement which includes a battery 33 adapted to supply the apparatus in the event of a current failure in the supplying network 30, moreover an alarm bell 20 and a warning light 21 form part of the equipment.

Normally the apparatus is not connected with the subscriber's telephone lines, such connection being only made in a manner described below when an alarm circuit is closed or opened. The special subscriber's telephone relay 11 which has been mentioned above connects the relay 22 and a further relay 25 as well as a transformer 26 supplied with a suitably amplified talking current generated by the recording device across the telephone subscriber's lines.

Figures 2, 4:
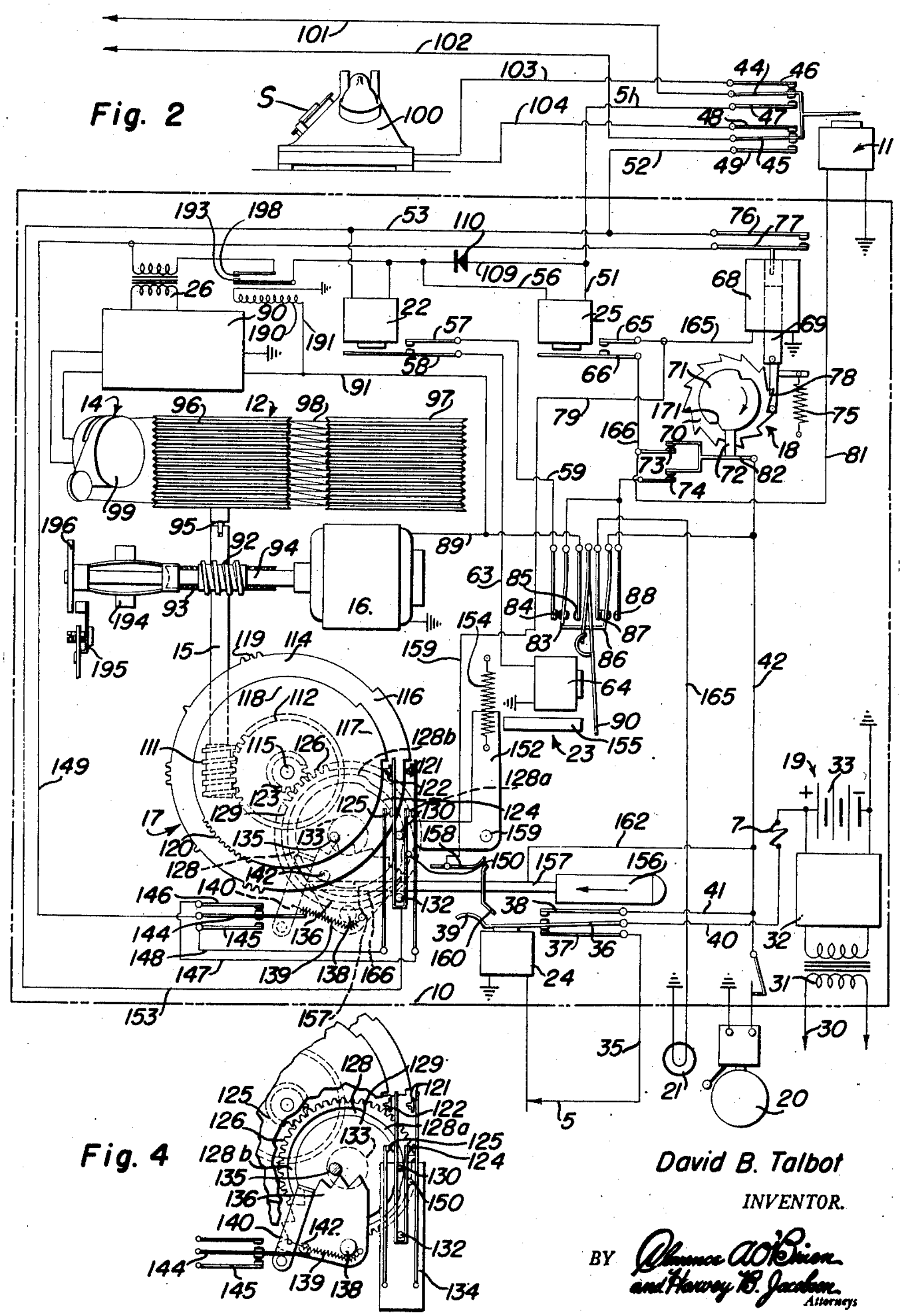
Figure 2 is a diagram of the connections, also illustrating some of the apparatus used.
Figure 4 is a diagram of the cam track of the assembly controlled by the dialing apparatus.

Referring now in detail to the apparatus diagrammatically represented in Figure 2 it will be seen that the source of current consists in a suitable A. C. network 30 which is connected by means of a transformer 31 with a rectifier 32 charging a battery 33. Battery 33 is therefore practically the source of current for the apparatus and it is mainly provided in order to furnish an alternative source of current in the event of a current failure in the network. Under normal conditions the battery is always maintained in a charged condition and in the event of a current failure the battery 33 is therefore capable of functioning for a certain period of time even if current from the main should have been cut off by a fire or by persons attempting to enter guarded premises.

The alarm circuit 35 shown in Figure 2 is a closed contact circuit of any approved type and is not illustrated in detail. Numerous types of alarm circuits are known and may be used either for protection against burglary or for protection against fire. Any type of alarm circuit and of alarm contact is practically usable. In Figure 1, in order to show some kind of alarm contact, a well known thermostatic feeler 60 has been shown connected by means of a cable 61 with the structure contained in the casing 10. This feeler is an example representing a series of fire or burglar alarm contacts guarding the premises.

The alarm contacts of the alarm circuit 35 are diagrammatically indicated at 5. The alarm circuit 35 forms part of the energizing circuit of the alarm relay 24 which relay is energized as long as the alarm circuit is closed and is in its normal condition. The alarm relay is provided with contact springs 36, 37, 38. The contacts 36, 37 are holding contacts which also form part of the alarm circuit 35 and which are closed when the relay is energized. However, contact spring 36 of the relay cooperates with the second contact 38 when the relay is de-energized by the opening of one of the alarm contacts 5 in the event of fire or burglary. The contact spring 36 is moreover also provided with an extension 39 for a mechanical operation of the same.

The relay contact 38 is energized as soon as the relay 24 falls back. It controls the operation of telephone relay 11 which, as above explained, is located at some point near the telephone and is housed in a separate small box 55. This relay shifts the line contacts 44, 45 from their normal position in which they are connected with contacts 46, 48 leading to the subscriber's telephone lines 103, 104 of the subscriber's station 100 to the contacts 47, 49 which are connected with the cable strands 51, 52 respectively of cable 50 leading from the box 55 to the casing 10 and which form part of the energizing circuits of the control relays 22 and 25. The latter relay controls the cut-off switch 18. Its energizing circuit 56 is bridged by a selenium cell 110 arranged for the purpose of energizing the relay only with a current flow in one direction, while currents flowing in the other direction may pass the selenium cell and do not pass the relay.

The relay 22 controls relay switch 23 which is of the toggle switch type and which remains in the position into which it has been brought by an impulse also after the impulse has ceased until a second impulse is received. A relay of this type has been described in detail in my earlier Patent No. 2,498,613, dated February 21, 1950. The control of the relay switch 23 is exercised by means of contacts 57, 58 connected with grounded coil 64 of the relay switch 23 and with the source of current respectively by means of conductors 63 and 59 respectively.

The relay switch 23 comprises a number of contact groups two groups forming triplets 83, 84, 85 and 86, 87, 88 respectively being shown. The first named contact group controls the energization of the motor 16 over circuit 89 and the energization of the amplifier 90 over the circuit 91. The contact 84 also controls the energization of the relay switch coil 64.

The second group or triplet controls a warning light 21 and also provides a parallel connection to the cut-off switch 18.

The electric motor 16 rotates the shaft 94 carrying a worm 92 engaging a worm wheel 93 on shaft 15. The shaft 94 also drives a governor 194 regulating the speed of the shaft by means of a brake disk 196 applied against a brake pad 195. Shaft 15 has a double connection. On one side the shaft is connected by means of a coupling 95 with a drum 96 provided with parallel grooves, cooperating with a second idling grooved drum 97. Between the two drums a magnetized recording wire is stretched which is endless and forms a closed wire loop and which carries the recorded spoken message, the said message consisting in an indication of the nature of the alarm and of the location of the guarded premises. Other useful information giving specific directives, such as the nature of the goods protected or the like, may be added. The magnetized recording wire runs through the grooves of the two drums and is paid out on one side and taken up on the other side of the drums when the drum 96 is rotated.

A magnet head 99 picks up the message by induction and transmits the induced currents to the amplifier 90 which is energized simultaneously with the motor 16. The amplifier produces voice currents of sufficient strength to be transmitted to the line by means of the transformer 26. The apparatus above described is practically identical with a similar apparatus described in my earlier Patent No. 2,498,613, dated February 21, 1950, and need not be described in more detail. A relay 190, preferably of the thermal type operating with a predetermined time delay is arranged with its heater or relay coil circuit 191 in parallel to the motor 16 and amplifier 90. This thermal relay operates two contacts 193, 198 closing after a period of several seconds, say 3 seconds, after the energization of the relay coil 190. The relay contacts 193, 198 keep the loop circuit over conductors 51, 56, 53 and 52 normally open, so that upon energization of relay 11 not only the subscriber's station S is disconnected from the line, but also any further station connected with lines 101 and 102 is disconnected, as well known, by the interruption of the loop which had been closed through the subscriber's station by the removing of the receiver from the hook. This interruption de-energizes the holding circuits and energizes the release magnets of the selectors, connectors and line switches which happen to be connected with the line when an alarm happens to occur while a telephonic connection has been established.

When the thermal relay 190 is operated however, it closes its contacts 193, 198 and thereby closes the loop circuit, after a delay which permits the return of the switches used during a connection to their original (inoperative) position. The delay in closing the loop circuit 51, 56, 53, 52 permits therefore a clear line for the alarm message the efficient operation of which may not be interfered with or impaired by its connection with the telephonic equipment of the telephonic exchange. When relay 11 has been operated the voice currents are transmitted to the lines 101, 102 leading to the central exchange and to the called substation which is located in the police or fire department station protecting the guarded premises.

The shaft 15 on the other side also drives the dialing apparatus 17 by means of a worm 111 engaging a worm wheel 112. The said worm wheel is mounted on a shaft 115 carrying two dialing disks 114 and 118. The first dialing disk 114 is provided at its periphery with groups of teeth 119 cooperating with an impulse spring 121 which operates an impulse contact pair 124. The groups of teeth arranged along the rim of the periphery of the disk produce the number of impulses necessary for calling the number of the police or fire station at the required intervals. Each group of teeth 119 therefore corresponds to one digit of the said number; for instance, a group of three teeth represents the digit 3 of the number of the called station and so forth.

In addition, the disk 114 is provided with an arcuate projecting sector covering an arc of approximately 36° which lifts the contact spring 121 from its contact 124 during a predetermined period of time.

The second dialing disk 118 is similarly equipped with teeth 120 and with an angular projecting rim sector 117. The teeth in this disk are so arranged that the number of the operator in the exchange will be called. The call sign for the operator consists usually of ten impulses only and the group of teeth 120 therefore consist of ten teeth arranged at the proper place.

The shaft 115 drives also pinion 123 meshing with a toothed wheel 126 producing a definite ratio of movement transmission and mounted on a shaft 133. The toothed wheel 126 is provided with or forms a cam member 129 with a cam groove 128 having a section 128a nearer to the center and a section 128b farther from the center. The section 128a is of a smaller extension than the section 128b. The first named section covers for instance an arc of 90° while the section 128b covers an arc of 270°. A pin 130 enters into the groove 128 and is moved thereby. This pin 130 projects from an assembly 134 which carries the two springs 121 and 122 and the impulse contact springs 124 and 125 cooperating with the above named springs. This assembly is pivotally mounted and may rock around the pivot 132.

When the pin 130 runs in the dwell section 128b which is farther removed from the center of the cam than the section 128a the assembly and the springs 121 and 122 are out of contact with the dialing disk and cannot be influenced by the same. Therefore the impulse springs cannot be separated and the telephone lines are uninterrupted. When the pin 130 however runs in the section 128a which is nearer to the center, the springs 121 and 122 are in contact with the periphery of the disks and are engaged by the groups of teeth 119, 120 and by the arcuate projections and sectors 116 and 117.

On the shaft 133 of the cam gear a pin 135 is mounted projecting in an axial direction which pin is adapted to cooperate with a ratchet wheel section 136 which is rotatable around shaft 138. The ratchet wheel is under the tension of a spring 139 and is held by a pawl 140 engaging the teeth of said wheel. The ratchet wheel has only just enough teeth to be moved through a certain arc, say through an arc corresponding to four teeth. Four tooth spaces are then the maximum rotation of which the ratchet wheel is capable and which the shaft 133 can produce.

On the ratchet wheel section 136 a tooth 142 is mounted which may come into contact with the spring 144 of the contact spring group 144, 145, 146 of a triplet when the ratchet wheel section 136 has been moved to its extreme position. The tooth 142 depresses spring 144 and interrupts its contact with spring 146, producing contact with spring 145. Contact 146 is connected with contact springs 121, while contact 145 is connected with impulse contact 125. The ratchet wheel section 136, when moved over to the maximum extent, therefore shifts the connection of the impulse conductor 149 from the pair 121—124 to the pair 122—125.

The cam disk 129 is provided with a pin 150 which cooperates with a bell crank lever 152 fulcrumed at 159 which is held in its normal position by a spring 154. The end of the bell crank lever 152 projecting toward the cam disk is bevelled so that the pin, upon rotation of the cam disk 129, is rocked and is then released, thus producing a slight hammer effect as this spring 154 is tensioned when the lever is moved and then returns the lever as soon as released by the pin. The lever is thus thrown to one side against a push rod 155 which shifts the armature 90 of the relay switch 23 mechanically.

The apparatus moreover comprises a cut-off switch 18 provided with a solenoid coil 68 operating a core member 69 which, on one end, when attracted by the coil, operates contacts 77 and 76 and on the other end operates a pawl 78 engaging ratchet wheel 70. The core member 69 is under the influence of a spring 75 which holds it in its inoperative position and which is sufficiently strong to advance the ratchet wheel 70 upon de-energization of the solenoid coil.

The ratchet wheel 70 carries a cam disk 71 provided with notches 171 against which a push rod 72 is bearing. The push rod 72 controls the contact pairs 73, 74 carried by spring 82 against which the push rod is applied, which contacts are closed when the push rod is held by the periphery of the cam disk 71 while the contacts are open when the push rod enters one of the notches 171. The elasticity of the spring 82 or a separate spring may be used to hold the spring 82 pressed against the push rod 72.

For resetting the apparatus after operation a reset button 156 is provided which actuates a push rod 157 consisting partly of conducting and partly of insulating material. The push rod carries a collar 160 which cooperates with the end 39 of spring 36 and which depresses the spring 36 when the button 156 is pushed. The other end of the collar makes contact with the slide contact 158 which is connected with conductor 159 leading to coil 68 of the cut-off switch 18. The conducting portion of rod 157 is in its turn connected by means of conductor 162 to the relay contact 38 of relay 24 and through this contact to the source of current. As the conducting portion of the push rod 157 extends through the collar 160 which is also conducting it will be clear that the pushing of the button 156 closes the circuit of the cut-off switch coil 68 in the event that relay 24 is de-energized.

The push rod 157 extends beyond the collar and has an extension which is applied against release pawl 140 which pawl is therefore disengaged from the ratchet wheel and releases the same when the button 156 is pushed so that the ratchet wheel can snap back into its normal position under the influence of spring 139.

An alarm bell or another acoustic signal 20 may announce the operation of the alarm circuit and this bell will continue to operate until cut out by manual switch 31.

Figure 3:
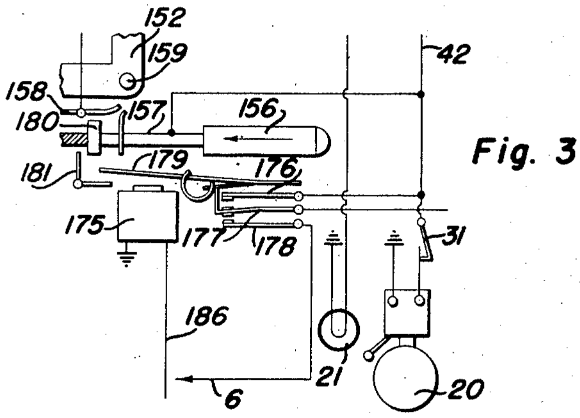
Figure 3 is a diagram of a modification of the system which is used when instead of a closed contact circuit an open contact circuit is employed. This diagram merely illustrates those parts of the system in which a change has occurred under the above-mentioned conditions.

In the event that an open contact circuit is to be used the contacts of which are closed by an attempt to burglary or by a rise of temperature a slight modification of some of the circuits has to take place. The units which have to be modified are shown in Figure 3. As seen in this figure the relay 24 is in this case replaced by a relay switch 175 of the toggle switch type which remains in its position after having been energized, the relay being preferably of the construction described in my earlier Patent No. 2,498,613, dated February 21, 1950. The open contact alarm circuit is indicated at 186 one of the open contacts being shown at 6 in the figure. It is to be understood that the circuit 186 and the contact 6 are only representative of one of the well known types of circuits with open contacts. The circuit 186 forms also a part of the energizing circuit of the relay switch 175.

The relay switch 175 is in this case provided with a number of springs 176, 177, 178 controlling the connection of the source of current with a telephone relay 11 and with the alarm circuit respectively.

The push rod 157 of the reset lever 156 is in this case provided with a further collar 180 contacting a bell crank lever 181 when the push button 156 is operated which bell crank lever 181 restores mechanically the relay springs to their original position. In all other respects the circuit shown in Figure 3 is to be considered as identical with the circuit shown in Figure 2 so that only those parts which have been modified are shown in the figure.

The operation of the system is the following.

It will be clear that as long as the alarm circuit 35 containing the fire alarm or burglary alarm contact 5 is closed the relay 24 will remain energized over a circuit including conductor 40, springs 36 and 37 of the relay 24, the alarm circuit 35 containing the alarm contacts one of which is illustrated at 5 and the grounded relay 24. When one of the alarm contacts is opened, the holding circuit of the relay is interrupted, and the relay 24 is de-energized. The armature spring 36 of the relay then moves into a position in which it contacts spring 38. A circuit is thereby closed over the conductor 41, the alarm bell 20 and ground which is connected with the source of current by means of conductor 40 and the armature spring 36. The bell will therefore operate and the bell circuit remains closed and operative until it is interrupted by means of the manual switch 31 which may be sealed by a protective wire.

The automatic operation of the device is started by the closure of the energizing circuit of the subscriber's line relay device 11. The circuit of the relay device 11 may be traced from spring 38 while connected with the source of current 30, 32, 33 by means of armature spring 36 and over conductors 41, 42, spring 82, contacts 73, conductor 81 and relay 11 to ground.

The operation of the subscriber's telephone line relay device 11 shifts the line contacts 44 and 45 of the relay device which are connected with the subscriber's lines 101 and 102 and which were originally in contact with springs 46 and 48 of the subscriber's station 100 and connects the lines 101 and 102 across a bridge, including conductors 52, 53, relay 22, conductor 56, relay 25 and conductor 51, a parallel connection to the relay 25 running over conductor 109 and selenium cell 110. The bridge connection includes contacts 193 and 195 which are open at the beginning but are closed by relay 190 after a short interval (say 3 seconds). When the relay operates, a closed loop is now connected across the subscriber's lines, in the well known manner and in the same way in which a closed loop is formed when the receiver of the subscriber's station is removed from its hook.

It will also be noted that if the subscriber should use the telephone at the time when the alarm device goes into operation, the subscriber's station will be disconnected and the alarm apparatus is given priority over the normal use of the telephone.

Dialing currents may now pass from the exchange through the lines 101 and 102 and through the loop which has been described above, which currents energize the relay 22.

These dialing currents may flow through the selenium cell 110 and through conductor 109 which are both in parallel to relay 25, the direction of the dialing current being such that the passage through the cell is permitted. The relay 25 is therefore not energized but remains idle with this direction of the current flow.

The relay 22 closes its springs 57, 58 and thereby also closes the circuit of the coil 64 of the relay switch 23. This circuit may be traced from the source of current and springs 36 and 38 of relay 24 over conductors 41 and 42, spring 82, contact 74 and spring 83 of relay switch 23 and over spring 84 of the said relay switch, conductor 59, springs 57 and 58 of relay 22 which are now closed to conductor 63 and over coil 64 to ground. The coil 64 of relay switch 23 therefore receives an impulse and changes the position of the switch and of the springs 83 and 86 from the position shown in Figure 2 into a position in which the two last named springs are in contact with springs 85 and 88.

When the relay switch 23 changes its position the motor 16, the thermal relay 190 and the amplifier 90 are connected with the source of current the circuit of the motor running from spring 83 connected with the source of current in the manner above described over spring 84 and conductor 89 to ground, while the circuit of the thermal relay 190 and of amplifier 90 branches off from conductor 89 and runs over conductor 91 to the thermal relay 190, amplifier 90 respectively and to ground.

When the motor is energized shaft 94 rotates worm 92 and worm wheel 93 and thereby also rotates shaft 15 which by means of the coupling 95 operates drum 96, winding and unwinding the endless magnetized record wires 98 which run over the idling drum 97 rotating the same. The magnet head 14 picks up the message recorded on the magnetized recording wire and transmits it to the amplifier. The recording of messages on the magnetized recording wire may for instance be made in such a way that a message indicating that the premises are on fire or have been entered by unauthorized persons is sent every eight seconds.

The shaft 15 turns worm wheel 112 by means of worm 111 and therefore also turns the two dialing disks 114 and 118. The dialing disk 114, as has been explained, is provided with groups of teeth on its rim corresponding to the number of the substation of the fire department or police station to be called. Dialing therefore starts as soon as the motor begins to operate. The impulse pawl 121 which is resting on the rim or periphery of the dialing disk is operated by each group of teeth passing the impulse pawl at the usual impulse rate (which is about ten impulses per second) and the said pawl separates the impulse contacts 124 for the required short impulse periods during its operation. Therefore impulses are sent over line 153, line 53 and conductor 52 and over closed springs 49 and 45 to line 102 leading to the exchange. After all the groups of teeth 119 have passed the impuse pawl 121 the number of the substation of the fire or police department has been selected. The disk 114 has been moved through an arc of approximately 144°.

In normal cases the call station answers the call promptly thus starting the operation which is described below.

However the subscriber's station in the police or fire department may also be busy or may even be out of commission. In both cases the connections would not proceed to the private contacts of the called station. If the subscriber's station is merely busy it is necessary to repeat the dialing for producing the selection of said desired subscriber's station, an operation which can only take place when the subscriber's station has been disconnected from the various selectors, connectors and other switches which have been operated with the first call. In order to produce such a disconnection in an ordinary telephone it is necessary to replace the receiver on the hook, thus interrupting the loop which has been formed within the subscriber's station which interruption will operate the release magnets of the selectors and connectors in the exchange and restore them to their original position. In order to be capable of producing the same result with the dialing device according to the invention a dialing disk is provided with a projecting sector 116. At the end of a complete dialing operation the impulse pawl 121 runs over said sector 116 and is lifted thus interrupting the contacts between the two impulse contacts 124 for one second. This produces an interruption of the loop for a sufficient time to permit the release magnet of the selectors and connectors in the exchange to operate and to make the station ready for a second call.

After such an interruption the station is ready for a further call and the calling of the fire department or police department station may be repeated.

During the rotation of the dialing disks 114, 118 and of the shaft 115 also pinion 125 and toothed wheel 126 have been rotated. The toothed wheel 126 rotates the cam 129 with its groove 128. At the start pin 130 which engages the groove 128 is in that segment 128 of the groove which is nearer to the center, thereby permitting the spring assembly 121, 122 to contact the rim of the dialing disks 114, 118. After a revolution of the dialing disk has been performed the dwell segment 128*b* becomes operative, as the groove segment 120*a* which is nearest the center extends only over an arc which corresponds to the transmission ratio between the shafts 115 and 133. This ratio is so selected that after a full revolution of the dialing disk the dwell section 128*b* becomes operative removing the spring assembly from the rim of the dialing disks 114 and 118 so that the telephone lines are now closed. Under the assumption that the ratio of transmission between the shafts 115 and 133 is 1 to 4 and that therefore the groove segment 120*a* extends over an arc of 90° and that one revolution of the dialing disk 114 or 118 takes ten seconds (one second for the projecting sector 116 and nine seconds for the teeth carrying section) there will be a pause of forty seconds after each dialing of the number, permitting the called subscriber to answer the call.

Pin 150 arranged near the end of the groove section 128*a* operates lever 152 and thus reverses the position of the relay switch 23 by means of the push rod 155. Thereby the motor 16 and the amplifier 90 are cut out. Simultaneously also the warning light 21 is operated. Should the cut-off switch 18 have finished its operation, as is described below, the subscriber's telephone relay device 11 will be released. If however dialing current continues because the called subscriber has not answered the call the said current keeps relay 22 energized and therefore also relay 11 will remain energized.

An impulse will be sent again through the relay switch 23 as soon as springs 83 and 84 come into contact and as long as dialing currents are flowing through relay 22 so that the contacts 57, 58 are closed. This impulse will bring back the relay switch into its operative position.

With each revolution of shaft 133, pin 135 advances the ratchet wheel 136 for one tooth. As has been stated the maximum advance in this case covers an arc occupied by four teeth. Upon advance through the arc occupied by four teeth pin 142 presses upon spring 144 disconnecting impulse spring 124 and connecting spring 125 with a line. Therefore after four calls which have not produced a response of the called subscriber the apparatus shifts the connection to the spring which is operated by disk 118 which disk is provided with a group of teeth producing impulses calling the operator.

It is of course assumed that this operation occurs solely when the police or fire department station is out of commission for the time being.

After the calling of the police or fire department station has been completed and when the call is answered the receiver in the called station is lifted thus completing a loop in the called station. Talking currents are now flowing to the two stations so that the message can be transmitted. The direction of flow of the talking currents is however the reverse of that of the dialing currents. Therefore current can no longer flow through the connection 109 and the selenium cell 110 which passes currents only in one direction, but the talking current must now flow through relay 25 which closes springs 65 and 66.

The operation of relay 25 closing springs 65 and 66 completes the energizing circuit of coil 68 of cut-off switch 18. Thereby the core 69 is attracted by the coil 68 and springs 76, 77 are closed while spring 75 is tensioned.

Closing of springs 76, 77 permits the called subscriber to listen to the message which is meanwhile delivered from the magnet head 99 through the amplifier 90 and transmitted to the line by means of the transformer 26 such message being delivered without disturbance or interruption by impulses.

After the message has been delivered the receiver in the called station is replaced on its hook and spring 75 may therefore return core 69 as the relay 25 becomes de-energized. When core 69 is returned the spring 75 by means of pawl 78 advances the ratchet wheel 70 for one tooth.

In order to restore the apparatus from the called station it is preferable to so arrange the apparatus that this operation must be repeated for a number of times until push rod 72 enter notch 171 of cam disk 71.

It may for instance be necessary to lift and to replace the receiver five times in order to bring the push rod 74 into the position in which it falls into the nearest notch.

When the push rod 72 enters the notch 171 the contact springs 73, 74 are opened into energizing circuit 166, 165 of relay 68 is interrupted. When now switch 23 is switched over by pin 150 and by lever 152 and is returned to its original position the subscriber's telephone is again connected with the telephone lines but the red warning light 21 is left burning.

The warning light 21 when burning indicates that the alarm has been given and was completed and that the alarm system is not now in service. When the proper measures have been taken against fire or burglary the alarm must be reset. Resetting is obtained by means of push button 156 which is depressed and closes an energizing circuit for coil 68 which attracts the core 69.

The resetting of alarm contact 5 and the depression of armature spring 36 of relay 24 by means of the extension 39 then interrupts the energization of the coil 68 and advances the ratchet wheel 70 for one tooth thus bringing the push rod 74, the spring 82 and the two contacts 73 and 74 into their original position.

As the source of current is now cut out and contact 5 and relay 24 is restored the alarm light 21 now again is extinguished.

Switch 31 (if it has been operated) is again closed and is preferably sealed by a protective wire which would have to be broken in order to put the alarm bell out of operation.

The apparatus is now in condition for further alarm operation.

The modification shown in Figure 3 operates exactly in the same way except that, upon closing of a contact 6, the relay switch 175 snaps to a new position and remains locked in this position. After the relay switch has been operated the further operation continues in the manner described in connection with Figure 2.

For the resetting operation however the relay has to be restored mechanically. As has been above explained push button 156 is provided with a collar 180 which impinges upon an arm of a bell crank lever 181 extending towards it.

When the bell crank lever is moved around its fulcrum its second arm lifts extension 179 of armature spring 177 of the relay switch and restores the relay switch to its original position.

It will be seen from the above that the apparatus provides a marked simplification of the device which has been described in my earlier Patent No. 2,498,613, dated February 21, 1950, which simplification permits the enclosing of the entire apparatus in a small container which may be portable such as shown in Figure 1. As seen from Figure 1 the connections of the subscriber's station do not undergo any change with the sole exception of the arrangement of the relay 11 which is inserted into the lines. The manipulation is very simple and does not require any special apparatus in the called station in order to stop the dialing operation in the calling station. The device may be so arranged that no special manipulation besides the replacement of the receiver on its hook is necessary in the called station although it is preferable, as above described, to acknowledge the receipt of the message by a special manipulation such as a repeated signal given by means of the receiver hook.

It will also be understood that the unessential details of the apparatus may be changed in many ways without departing from the essence of the invention as defined in the annexed claims.

Having described the invention, what is claimed as new is:

1. An automatic alarm system for use in connection with a subscriber's telephone station and line connected with a telephone system, comprising an endless record, means for producing talking currents from said record and for transmitting the same, an automatic dialing mechanism for dialing a predetermined telephone number, an electric motor and driving means for driving the record and the dialing mechanism, an operative circuit for said motor, an alarm circuit and an alarm relay and alarm contact operated by the alarm producing disturbance, said relay and contact forming parts of said alarm circuit, a loop circuit connectable across the subscriber's telephone lines upon closure of the alarm circuit but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a toggle type relay switch, with shiftable control contacts, said relay switch shifting its contacts upon reception of an impulse from one position into a second position, means for controlling the said relay switch by the closing of the loop circuit when connected across the subscriber's lines, said relay switch contacts controlling the operative circuit of the electric motor driving the endless record and the automatic dialing means.

2. An automatic alarm system for use in connection with a subscriber's telephone station and line connected with a telephone system, comprising an endless record, means for producing talking currents from said record and for transmitting the same, an automatic dialing mechanism for dialing a predetermined telephone number, an electric motor and driving means for driving the record and the dialing mechanism, an operative circuit for said motor, an alarm circuit and an alarm relay and alarm contact operated by the alarm producing disturbance, said relay and contact forming parts of said alarm circuit, a loop circuit connectable across the subscriber's telephone lines upon closure of the alarm circuit but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a loop relay in the closed loop circuit, operated by dialing currents flowing through a closed loop circuit connected with the subscriber's lines, armature contacts operated by said loop relay, a toggle type relay switch with a winding and shiftable contacts alternatively occupying two positions and remaining in their position when shifted upon passage of an impulse through the winding and said loop relay armature contacts controlling the energization of the relay switch winding, said shiftable toggle type switch relay contacts controlling the operative circuit of the electric motor driving the endless record and the automatic dialing means.

3. An automatic alarm system for use in connection with a subscriber's telephone station and line connected with a telephone system, comprising an endless record, means for producing talking currents from said record and for transmitting the same, an automatic dialing mechanism for dialing a predetermined telephone number, an electric motor and driving means for driving the record and the dialing mechanism, an operative circuit for said motor, an alarm circuit and an alarm relay and alarm contact operated by the alarm producing disturbance, said relay and contact forming parts of said alarm circuit, a loop circuit connectable across the subscriber's telephone lines upon closure of the alarm circuit but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a loop relay in the closed loop circuit, operated by dialing currents flowing through a closed loop circuit connected with the subscriber's lines, armature contacts operated by said loop relay, a toggle type relay switch with a winding and shiftable contacts alternatively occupying two positions and remaining in their position when shifted upon passage of an impulse through the winding and said loop relay armature contacts controlling the energization of the relay switch winding, said shiftable toggle switch relay contacts controlling the operative circuit of the electric motor driving the endless record and the automatic dialing means, a cut-off switch for controlling the circuit of the aforesaid electric motor, when closed by the toggle type relay switch contacts, and means for operating said cut-off switch controlled by the operator of the called substation.

4. An automatic alarm system as claimed in claim 3, wherein the means for operating said cut-off switch include a cut-off relay in the loop circuit, means for by-passing the dialing currents passing through the loop around said relay upon closure of the loop by the telephone relay device, said means being only effective for one direction of current, thus forcing talking currents flowing through the line upon response of the called station and having an opposite direction of flow through said cut-off relay.

5. An automatic alarm system as claimed in claim 3, wherein the means for operating said cut off switch include a cut off relay in the loop circuit arranged in series with the loop relay, a selenium cell, by-passing currents flowing in one direction connected across said cut off relay, said selenium cell by-passing dialing currents flowing during the calling period upon closing of the loop by the telephone relay device and stopping currents flowing through the by-pass upon response of the called subscriber which response reverses the direction of flow of the currents through the loop, a winding in the cut off switch, an energizing circuit for said winding, and armature contacts operated by said cut off relay when energized and controlling the energizing circuit of the cut off switch.

6. An automatic alarm system for use in connection with a subscriber's telephone station and line connected with a telephone system, comprising an endless record, means for producing talking currents from said record and for transmitting the same, an automatic dialing mechanism for dialing a predetermined telephone number, an electric motor and driving means for driving the record and the dialing mechanism, an operative circuit for said motor, an alarm circuit and an alarm relay and alarm contact operated by the alarm producing disturbance, said relay and contact forming parts of said alarm circuit, a loop circuit connectable across the subscriber's telephone lines upon closure of the alarm circuit but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a toggle type relay switch with shiftable contacts, said relay switch shifting its contacts from one position into a second position upon reception of a current impulse, said shiftable contacts controlling the operative circuit of the electric motor driving the endless record and the automatic dialing means, a cut off switch, including a winding and contacts, further controlling the circuit of the aforesaid electric motor when closed by the toggle type switch relay contacts, means for energizing said cut off switch, including an energizing circuit for the cut off switch winding operative upon response of the operator in the called station, and means for de-energizing the said cut off switch including a mechanical step for step operating device operated by the cut off switch winding and under the control of the operator in the called station, operating the aforesaid cut off switch contacts controlling the circuits for the electric motor driving the endless record and the dialing device, and a further pair of contacts operated by the same mechanical device for cutting the energizing circuit of the cut off switch winding.

7. An automatic alarm system for use in connection with a subscriber's telephone station and line connected with a telephone system, comprising an endless record, means for producing talking currents from said record and for transmitting said currents, an automatic dialing mechanism, including a rotatable dialing disk, means for driving said dialing disk, said disk being provided with sets of impulse teeth and a projecting sector of a predetermined arcuate length, an impulse control spring operated by said teeth and said projecting sector, impulse contacts operated by said spring and connected with the subscriber's line for dialing a number of impulses selecting a called telephone station and for interrupting the loop connection for a predetermined period of time in the event of the call to the called station being not completed respectively, means for moving the impulse control spring from its operative position into an inoperative position relatively to the rotating dialing disk after completion of a call for a predetermined period of time, an electric motor for driving the endless record and the driving means of the dialing disk, an operative circuit for said motor, an alarm circuit and an alarm relay and alarm contact operated by the alarm producing disturbance, said relay and contact forming parts of said alarm circuit, a loop circuit connectable across the subscriber's telephone lines but normally disconnected, a telephone relay device, having armature contacts controlling the connection of the subscriber's telephone lines and telephone station, and further disconnecting the subscriber's telephone lines from the station and connecting them with the loop circuit upon closing of the alarm circuit, an operative circuit for said telephone relay device, controlled by said alarm relay, a toggle type relay switch with shiftable control contacts alternatively occupying two positions, said relay switch shifting its contacts upon reception of an impulse from one position into the second pisition, means for controlling the said relay switch by the closing of the loop circuit when connected across the subscriber's lines, said relay switch contacts controlling the operative circuit of the electric motor driving the endless record and the automatic dialing means.

8. An automatic alarm system for use in connection with a subscriber's telephone station and line connected with a telephone system, comprising an endless record, means for producing talking currents from said record and for transmitting said currents, an automatic dialing mechanism, including a plurality of dialing disks for alternative use, means for rotating both dialing disks conjointly at the same speed, each of said dialing disks including sets of impulse teeth and a projecting sector of a predetermined arcuate length, an impulse spring operated by said impulse contact and said projection for each of said disks, a pair of impulse contacts operated by each of said springs, connectable with the telephone subscriber's lines, means for removing the impulse springs from their operative position into an inoperative position after completion of a call for a predetermined period of time, means for shifting the connection of the impulse contacts operated by one dialing disk to another dialing disk after a number of revolutions of the dialing disks, an electric motor for driving the endless record and the means for rotating the dialing disks, an operative circuit for said motor, an alarm circuit and an alarm relay and alarm contact operated by the alarm producing disturbance, said relay and contact forming parts of said alarm circuit, a loop circuit connectable across the subscriber's telephone lines upon closure of the alarm circuit, but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a toggle type relay switch with shiftable control contacts, said relay switch shifting its contacts upon reception of an impulse from one position into a second position, means for controlling the said relay switch by the closing of the loop circuit when connected across the subscriber's lines, said relay switch contacts controlling the operative circuit of the electric motor driving the endless record and the automatic dialing means.

9. An automatic alarm system for use in connection with a subscriber's telephone station and line connected with a telephone system, comprising an endless record, means for producing talking currents from said record and for transmitting said currents, an automatic dialing mechanism, including a rotatable dialing disk, means for rotating the same, said disk being provided with sets of impulse teeth and a projecting sector of a predetermined arcuate length, an impulse control spring operated by said teeth and said projecting sector, impulse contacts operated by said spring and connected with the subscriber's lines for dialing a number of impulses selecting a called telephone station, when operated by the impulse teeth, a rockable support carrying said impulse spring, a cam member rotated by said dialing disk and a member on said rockable support cooperating with said cam member, said cam member being adapted to rock said rockable support and to bring the impulse control spring out of engagement with the impulse teeth after one revolution for a predetermined number of revolutions, an electric motor for driving the endless record and the rotating means of the dialing disk, an operative circuit for said motor, an alarm circuit and an alarm relay and alarm contact operated by the alarm producing disturbance, said relay and contacts forming parts of said alarm circuit, a loop circuit connectable across the subscriber's telephone lines but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a toggle type relay switch, with shiftable control contacts, said relay switch shifting its contacts upon reception of an impulse from one position into a second position, means for controlling the said relay switch by the closing of the loop circuit when connected across the subscriber's lines, said relay switch contacts controlling the operative circuit of the electric motor driving the endless record and the automatic dialing means.

10. An automatic alarm system for use in connection with a subscriber's telephone station and line connected with a telephone system, comprising an endless record, means for producing talking currents from said record and for transmitting said currents, an automatic dialing mechanism, including a plurality of dialing disks for alternative use, means for rotating both dialing disks conjointly at the same speed, each of said dialing disks including sets of impulse teeth and a projecting sector of a predetermined arcuate length, an impulse spring operated by said impulse contact and said projection for each of said disks, a pair of impulse contacts operated by each of said springs connectable with the telephone subscriber's lines, means for removing the impulse springs from their operative position into an inoperative position after completion of a call for a predetermined period of time, a ratchet wheel and a holding catch member for holding the same, a disk provided with a driving member for said ratchet wheel rotated by the dialing disk at a predetermined ratio of transmission of motion, a spring triplet with a central control spring for shifting the connection of the impulse contacts operated by one dialing disk to another dialing disk, means for operating the control spring of the spring triplet including an operating member on the ratchet wheel engaging said spring after a predetermined rotational movement of the ratchet wheel, an electric motor for driving the endless record and the means for rotating the dialing disks, an operative circuit for said motor, an alarm circuit and an alarm relay and alarm contact operated by the alarm producing disturbance, said relay and contact forming parts of said alarm circuit, a loop circuit connectable across the subscriber's telephone lines, but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a toggle type relay switch, with shiftable control contacts, said relay switch shifting its contacts upon reception of an impulse from one position into a second position, means for controlling the said relay switch by the closing of the loop circuit when connected across the subscriber's lines, said relay switch contacts controlling the operative circuit of the electric motor driving the endless record and the automatic dialing means.

11. An automatic alarm system for use in connection with a subscriber's telephone station and line connected with a telephone system, comprising an endless record, means for producing talking currents from said record and for transmitting said currents, an automatic dialing mechanism, including a plurality of dialing disks for alternative use, means for rotating both dialing disks conjointly at the same speed, each of said dialing disks including sets of impulse teeth and a projecting sector of a predetermined arcuate length, an impulse spring operated by said impulse contact and said projection for each of said disks, a pair of impulse contacts operated by each of said springs, connectable with the subscriber's telephone lines, a rockable support carrying said impulse springs, a cam member rotated by said dialing disks, and a pin on said rockable support cooperating with said cam member, for moving said rockable support and the impulse spring supported by it out of engagement with the impulse teeth and the arcuate sector projecting from said dialing disks, after one revolution of said disks for a predetermined period of time, a pin on said cam member, a sector with ratchet teeth rotatable around a pivot in operative connection with said pin so as to be advanced for one tooth upon a revolution of the cam, a holding catch for said ratchet sector, a spring for holding said catch against said sector, an actuating pin on said ratchet wheel sector, a further group of contacts forming a triplet, one contact being carried by a control spring for shifting the line connection between the impulse contacts and the line from the impulse contact pair operated by one dialing disk to the impulse contact pair operated by another dialing disk, said impulse contact control spring being mounted in operative position with respect to the actuating pin on said ratchet wheel sector, an electric motor for driving the endless record and the means for rotating the dialing disks, an operative circuit for said motor, an alarm circuit and an alarm relay and alarm contact operated by the alarm producing disturbance, said relay and contact forming parts of said alarm circuit, a loop circuit connectable across the subscriber's telephone lines but normally disconnected, a telephone relay device having armature contacts controlling the connection of the subscriber's telephone lines and telephone station, and further contacts disconnecting the subscriber's telephone lines from the station and connecting them with the loop circuit upon closing of the alarm circuit, an operative circuit for said telephone relay device, controlled by said alarm relay, a toggle type relay switch, with shiftable control contacts, said relay switch shifting its contacts upon reception of an impulse from one position into a second position, means for controlling the said relay switch by the closing of the loop circuit when connected across the subscriber's lines, said relay switch contacts controlling the operative circuit of the electric motor driving the endless record and the automatic dialing means.

12. In an alarm system as claimed in claim 11, a mechanical shifting member for shifting and returning the control contact of the toggle type relay switch, a pivoted lever for actuating said shifting member and a pin on the cam member for actuating said lever after one revolution of the driving disks.

13. In an alarm system as claimed in claim 12, a warning light and a warning light circuit, closed by the mechanical shifting and returning of the control contacts of the toggle type relay switch to indicate operation of the alarm system and inoperativeness of the same for further alarms for the time being.

14. In an alarm system as claimed in claim 7, a cut off switch comprising a winding and contacts operated by said winding when energized, means for energizing said cut off switch, controlled by the operator of the called substation, said contacts, when operated by the energized winding of the cut off switch, closing a connection short circuiting the impulse contacts and their lines, to connect the means for transmitting the talking currents produced by the record with the loop across the subscriber's lines while making the impulse contacts inoperative.

15. In an alarm system as claimed in claim 10, a resetting mechanism including a resetting button with a partly insulating and partly conducting push rod, adapted to be operatively applied against the holding catch member, said push rod being also provided with a collar for mechanically resetting the alarm contact, a cut off switch for controlling the circuit of the electric driving motor of the endless record and the dialing disk rotating means, said cut off switch being provided with a winding, an energizing circuit for said winding, a contact near the resetting push rod and a contact member on the push rod, said push rod contact closing the energizing circuit of the cut off switch when the reset push button has been pushed in order to return the cut off switch into its position of readiness.

16. In an alarm circuit as claimed in claim 2, in addition means for keeping the loop circuit, normally open, and further means for closing the said loop circuit upon connection with the subscriber's lines after a predetermined time interval.

17. In an alarm circuit as claimed in claim 2, in addition a delayed action relay provided with relay contacts, the latter included in the loop circuit, connected across the subscriber's telephone lines, an operative circuit for said delayed action relay, said operative circuit being controlled by the shiftable toggle switch type relay contacts.

18. In an alarm circuit as claimed in claim 2, in addition a thermal relay with a heater coil and relay contacts, the latter operating at a predetermined time interval after energization of the heater coil and being included in the loop circuit across the subscriber's telephone lines, an operative circuit for said thermal relay, said operative circuit being controlled by the shiftable toggle switch type relay contacts.

DAVID B. TALBOT.

REFERENCES CITED

The following references are of record in the file of this patent:

UNITED STATES PATENTS

| Number | Name | Date |
|---|---|---|
| 2,036,420 | Lowry et al. | Apr. 7, 1936 |
| 2,191,971 | Mountstephen | Feb. 27, 1940 |
| 2,332,776 | Bell | Oct. 26, 1943 |